No. 658,428.  
G. W. CONSTANTINE.  
SAUSAGE CLEANING MACHINE.  
(Application filed May 17, 1900.)
Patented Sept. 25, 1900.
(No Model.)
3 Sheets—Sheet 1.
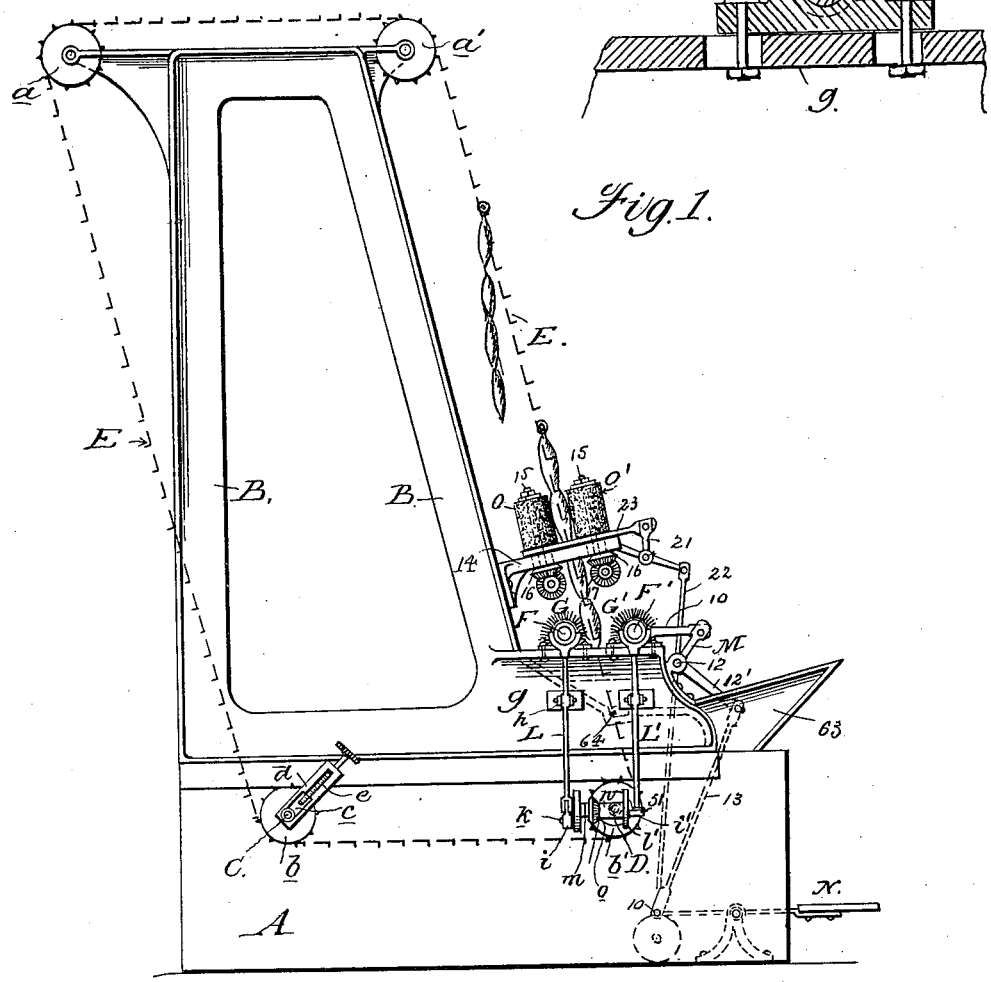
WITNESSES  
Walter T. Buckhead.  
C. W. Fowler
INVENTOR  
George W. Constantine  
by T. Walter Fowler  
his Attorney
THE NORRIS PETERS CO., PHOTO-LITHO., WASHINGTON, D. C.

No. 658,428. Patented Sept. 25, 1900.
G. W. CONSTANTINE.
SAUSAGE CLEANING MACHINE.
(Application filed May 17, 1900.)
(No Model.) 3 Sheets—Sheet 2.
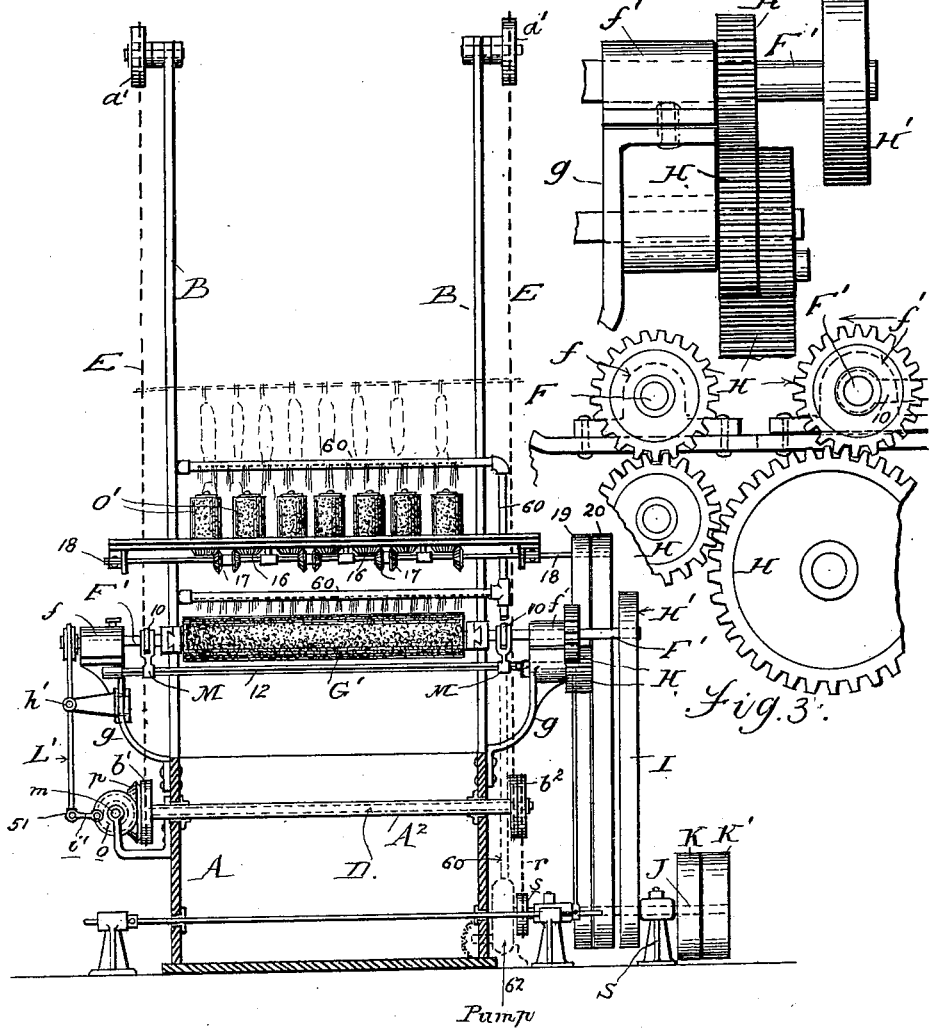
WITNESSES
Walter T. Burckhead.
C. H. Fowler.
INVENTOR
George W. Constantine
by T. Walter Fowler
his Attorney No. 658,428. Patented Sept. 25, 1900.
G. W. CONSTANTINE.
SAUSAGE CLEANING MACHINE.
(Application filed May 17, 1900.)
(No Model.) 3 Sheets—Sheet 3.
Fig. 5
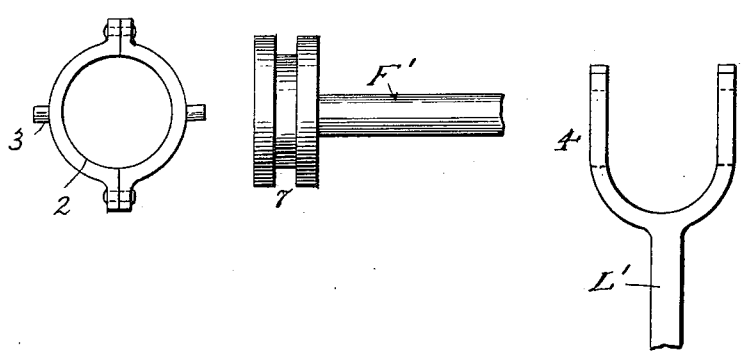
Fig. 6.
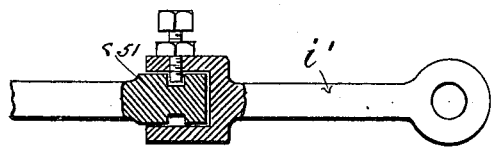
Fig. 7.
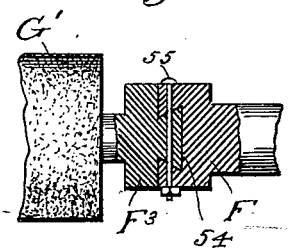
Fig. 8.
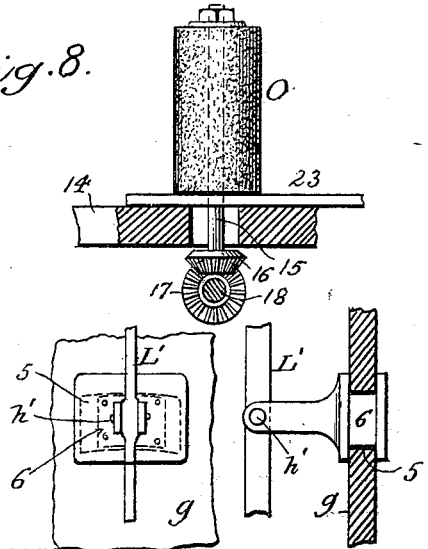
Fig. 9.
WITNESSES
Walter T. Birckhead
C. W. Fowler
INVENTOR
George W. Constantine
by P. Walter Fowler
his Attorney
THE NORRIS PETERS CO., PHOTO-LITHO., WASHINGTON, D. C.

UNITED STATES PATENT OFFICE.

GEORGE W. CONSTANTINE, OF CHICAGO, ILLINOIS.

SAUSAGE-CLEANING MACHINE.

SPECIFICATION forming part of Letters Patent No. 658,428, dated September 25, 1900.

Application filed May 17, 1900. Serial No. 16,990. (No model.)

*To all whom it may concern:*

Be it known that I, GEORGE W. CONSTANTINE, a citizen of the United States, residing at Chicago, in the county of Cook and State of Illinois, have invented new and useful Improvements in Sausage-Cleaning Machines, of which the following is a specification.

This invention relates to a new and useful machine for washing and cleaning sausages, so as to relieve them of the mold of fungous growth which forms upon them during the weeks and months they are held suspended to complete their curing and drying.

The invention consists of the parts and the constructions and combinations of parts, which I shall hereinafter describe and claim.

In the manufacture of what is known as "summer sausage" the sausages are usually tied with strings and hung on sticks, which for convenience in handling are usually about seven-eighths of an inch thick, one and three-fourths inches wide, and about four feet long. From each of such sticks are suspended from eight (8) to twelve (12) pieces, more or less, of sausage of various lengths, according to the several kinds of sausage made, some of which may hang twelve inches from the stick, while others may hang as much as forty inches therefrom. The sausages remain suspended or hanging from these sticks throughout the several steps or processes of the curing and drying and up to the time of packing them into boxes for shipment. To thoroughly cure and dry the sausage requires several months, and during this period of time a mold will form upon the sausage and which, being a fungous growth, will in time destroy them for commercial purposes and greatly deteriorate them for all purposes. In the presence of dampness and during seasons of long rain the formation and growth of the mold is more rapid and pronounced, and the sausages, in order to preserve them and rid them of the deleterious mold, are more or less frequently removed and washed in warm water and brushed by hand and then wiped dry and again hung up for further curing and drying. To take the place of this slow and expensive handling and hand manipulation of the sausages and to devise a machine in which the sausages are brushed and washed more thoroughly and at less expense than when these operations are conducted by hand is the essential object of the present invention, the machine being so designed that the sticks from which the sausages are suspended are attached to a carrier and the sausages drawn in contact with brush-rollers, the machine handling the sausages without removing the latter from the sticks and one operator taking the sticks from a truck and placing them on the carrier, while another operator at the opposite side removes the sticks from the carrier and places them upon a truck, by which they are conveyed to the curing and drying room or place where they were before suspended.

In the accompanying drawings, in which similar characters of reference indicate corresponding parts throughout the several views, Figure 1 is a side elevation of a sausage washing and cleaning machine embodying my invention. Fig. 2 is a front view of the same with parts broken away and shown in section. Fig. 3 is an enlarged detail showing a side view of the train of gearing for driving the brushes and a part of the frame and means for adjusting the slidable brush. Fig. 4 is an end view of Fig. 3. Figs. 5, 6, 7, 8, and 9 are details to be hereinafter referred to. Fig. 10 is a detail of one of the movable boxes for the brush G'.

In said drawings, A represents a water tank or vat of any desired and appropriate construction, capacity, and design, and B represents two standards or sides forming a framework, which extends vertically above the tank or vat and may be supported on or formed with the latter, as may be desired. At the front the standards or frames B converge from their bases toward their upper ends, and at said upper ends of each standard are suitably mounted sprocket-wheels $a\ a'$. Passing transversely through hollow shafts $A^2$, fixed in the tank or vat A, are the shafts C D, the ends of which project beyond the outer sides of the tank or vat and have secured to them sprocket-wheels $b\ b'$, around which and the sprocket-wheels $a\ a'$ at the top of the side frames B pass the endless chains or carriers E, the upper and lower portions of which travel in horizontal planes, while the front and rear portions are inclined to the vertical, as shown. To maintain the chains or carriers under proper tension and to take up any slack in them, I prefer to mount the ends of the shaft C in boxes c, which are movable in guides d by means of adjusting-screws e. Various forms of belt-tighteners may be used for this same purpose. Therefore I do not limit myself to the form of devices shown for regulating the tension of the chains or carriers.

Above the tank or vat A and suitably mounted in boxes or bearings $f f'$, formed in or secured to arms or brackets $g$ or other rigid part of the framework, are the horizontal transverse shafts F F' of parallel brushes G G', one of which, G, is fixed, while the other, G', is movable toward and from its companion. Rotary motion is imparted to said brushes by reason of a train of suitable gearing H, pulley H', belt I, and a pulley on the power-shaft J, which latter shaft is provided with fast and loose pulleys K K' and is appropriately mounted in boxes or bearings in the standards S.

In addition to their rotation the brushes G G' are intended to have a reciprocating endwise movement to better facilitate their cleaning action, such reciprocating movement being produced by levers L L', the former being connected with the brush G and fulcrumed at $h$ and having its upper end forked and slotted at 4 to engage pins 3 on a divided ring 2, loosely fitting a collar 7 on an outer end of the brush-shaft, and having its lower end pivotally fitted to a rod or link $i$, which is in turn connected with a crank or wrist pin $k$, projecting from a disk $l$ on a short shaft $m$, mounted in bearings $n$, supported from the tank or vat. This shaft $m$ is also provided with a miter-gear $o$, which meshes with a similar gear $p$ on the shaft D, which carries the sprocket-wheels $b'$, power being communicated to the said shaft D by means of a second sprocket-wheel $b^2$ on the power side of the machine, engaged and operated by a chain or belt $r$, driven by a sprocket-wheel $s$ on the main power-shaft, as shown in Fig. 2.

The lever L', which actuates the brush G', which has its shaft mounted in slidable boxes $f'$, has its upper end forked to engage said shaft, while the lower end of the lever is connected by a ball or swivel joint at 51, Fig. 6, with a link or rod $i'$, projecting from a disk $l'$ on the end of the shaft $m$ opposite to the disk $l$, said lever being fulcrumed at $h$ in a bearing having a plate or block 6, movable in a curved slot 5, which is struck from the universal joint at 51 to allow the lever to perform its functions when the slidable box $f'$ is pushed in or out, as I will presently describe. From this arrangement it will be apparent that as the brushes are rotated by the belt and gearing before alluded to the disks $l$ $l'$ are rotated in planes transverse of the machine, and the levers L are rocked about their fulcrum-points, and thereby induce an endwise movement of the brushes, the shafts which carry the latter being sufficiently long between the bearings or boxes to provide for this movement, and the combined rotary and longitudinally-reciprocating movement insures every part of the sausage being operated upon and cleansed of its mold or foreign matter.

In addition to the foregoing movements the brushes are movable one relative to the other— that is, the brush G' is so mounted that it may be moved relatively toward and from the companion brush, thereby increasing and diminishing the distance between the two. To effect this purpose, the shaft of the brush G' is provided with forwardly-projecting arms 10, which are loose thereon and are pivotally connected with arms or levers M, slidably mounted on a transverse shaft 12, said shaft having a crank or arm 12', pivotally connected with a rod or connection 13, leading to and pivotally connected with a pivoted foot-treadle N, as shown in Fig. 1, whereby when said treadle is depressed by the operator the shaft 12 is turned in its bearings, and the arms or levers M act upon the shaft F' of the brush G', and said brush and its shaft and boxes are pushed inward toward the brush G, the lever L' swinging laterally about its centers of motion to accommodate this movement.

To secure the brushes to their shafts and to permit their removal without dismembering a large part of the machine, I have shown the shaft divided transversely, Fig. 7, so as to form two end portions and an intermediate portion $F^3$, the former being mounted to turn and slide in the boxes and their inner ends being formed with dovetailed sockets 54, adapted to receive corresponding ends on the intermediate portion $F^3$ of said shaft, a pin 55 being employed, if desired, to hold the dovetailed parts in place. The distance between the brushes and their pressure upon the sausages, which are carried between them by the endless chains or carriers, are thus regulated by the foot movement of an operator.

Above the brushes G G' and supported by a bracket or platform 14 or supporting means of any well-known character I arrange a double row of vertical brushes O O', which are mounted in a slidable frame 23 and the shafts 15, Fig. 8, of which have secured to their lower ends miter-gears 16, which mesh with similar gears 17 on parallel transverse shafts 18, suitably mounted beneath the platform or bracket and rotated by power from belts 19 20, driven from the main power-shaft. These vertical brushes rotate in opposite directions and are disposed just above the horizontal brushes, and the sausages, which are suspended from the drying-sticks carried by the chains or carriers, are drawn between the double row of brushes, as shown by dotted lines in Figs. 1 and 2, and further cleaned by the action of these supplemental brushes. The shafts of the vertical brushes pass through slots in the bracket or platform of such width that said brushes may be moved in and out simultaneously with the movement of the horizontal brushes and by the same movement of the foot-treadle N, this movement being effected by means of a rock-shaft having an arm or lever 21 and a rod 22, connecting a crank or arm 10 on the shaft with the treadle, the arm or lever 21 being connected with the sliding frame 23, mounted on top the bracket or platform 14 and carrying the vertical brushes.

Between the vertical brushes the sausages are carried while suspended from drying-sticks, which are detachably hung upon the chains or carriers.

In connection with the brushes perforated pipes 60, Fig. 2, may be employed to distribute water to the brushes to facilitate their operation. Such pipes will be connected with some form of pump 62, deriving its water from the tank or vat; but other means of supplying this water may be used, and the several detailed parts herein shown and described may be modified without materially altering the scope of the present invention. I therefore do not limit myself to the precise constructions and arrangement shown and described.

In operation the drying-sticks and their hanging sausages are brought from the drying and curing room on trucks, and an operator places the sticks in notches formed in the frame at about the point 64, the sausages being passed into the hopper 63 and hanging in the water of the tank or vat A. The chains engage the stick and carry the sausages upward in the direction of the arrow through the main and supplemental brushes, the sausages being washed and scrubbed during their passage and after being removed with their sticks at the opposite side of the chains are again sent to the drying-room, or they may be wiped dry by hand or rolled in dry sawdust and sent through a drying apparatus (not shown) and subsequently packed for shipment.

A machine of this character will handle a given amount of sausage at less than one-third of the expense incurred by hand labor, one machine in a ten-hours' actual run cleaning over five hundred sticks of sausage per hour, aggregating for the ten hours over one hundred and fifty thousand pounds of sausage handled and cleaned.

Having thus described my invention, what I claim as new, and desire to secure by Letters Patent, is—

1. The combination with a main frame having means for supporting the articles to be cleaned, of vertically-traveling chains or carriers, opposing brushes between which the chains or carriers pass and means for rotating the brushes, said chains or carriers capable of removing the articles from their support on the frame and transporting them between the brushes.

2. In a sausage-cleaning machine, the combination with a main frame, of endless side chains or carriers one upon each side of said frame and between which the sausages are detachably suspended; independent, horizontal, parallel shafts extending transversely across said frame, opposing horizontally-extending brushes on said shafts and between which the sausages are drawn by the chains or carriers, and means for rotating said brushes.

3. In a sausage-cleaning machine, the combination of a main frame, vertically-traveling chains or carriers one upon each side of said frame and between which the sausages are suspended, horizontal parallel brushes between which the sausages are drawn by the carriers, means for rotating the brushes and means for reciprocating the brushes endwise simultaneously with their rotation.

4. In a sausage-cleaning machine, the combination of a main frame, a tank or vat, vertically-traveling chains or carriers one upon each side of said frame and from which the sausages are detachably suspended, opposing horizontal brushes between which the sausages are drawn by the carriers, means for rotating the brushes, bearings in which the axes of the shafts are slidably mounted and means for reciprocating the brushes endwise simultaneously with their rotation.

5. In a sausage-cleaning machine, the combination of a main frame, vertically-traveling chains or carriers one upon each side of said frame and between which the sausages are detachably suspended, horizontal, oppositely-rotatable brushes between which the sausages are drawn by the carriers, vertical brushes above the horizontal brushes and between which the sausages pass after leaving the former, and means for rotating the brushes.

6. In a sausage-cleaning machine, the combination of a main frame, a tank or vat, vertically-traveling chains or carriers one upon each side of said frame and from which the sausages are detachably suspended, a double series of spaced opposing brushes between which the sausages are drawn by the carriers, one of said series of brushes arranged substantially at right angles to the other, means for rotating the brushes of each series in opposite directions and means for reciprocating the brushes of one series simultaneously with their rotation.

7. In a sausage-cleaning machine, the combination of a main frame, a tank or vat, vertically-traveling chains or carriers one upon each side of said frame and from which the sausages are detachably suspended, opposing horizontal brushes between which the sausages are drawn by the carriers, means for rotating the brushes in opposite directions, and means for moving one of said brushes toward and from its companion.

8. In a sausage-cleaning machine, the combination of a main frame, a tank or vat, vertically-traveling chains or carriers one upon each side of said frame and between which the sausages are suspended, horizontally-disposed parallel brushes and means for rotating the same in opposite directions, and means including a pivoted treadle, a crank-shaft and connections therefrom whereby one of said brushes is movable toward and from its companion.

9. In a sausage-cleaning machine, the combination of a main frame, a tank or vat, vertically-traveling chains or carriers one upon each side of said frame and from which the sausages are suspended, vertically-disposed brushes arranged in opposing pairs and between which the sausages are drawn by the carriers, means for rotating the brushes, and means for moving them relatively toward and from each other.

10. In a sausage-cleaning machine, the combination of a main frame, a tank or vat, vertically-traveling chains or carriers, one upon each side of the frame, vertically-disposed opposing brushes and means for rotating the same in opposite directions, and means including a pivoted treadle, a crank-shaft, a slidable frame and connections between it and the shaft whereby the brushes are movable in horizontal planes.

11. In a sausage-cleaning machine, the combination of a main frame, a tank or vat, vertically-traveling chains or carriers one upon each side of the frame for transporting the sausages, a pair of horizontal brushes between which the sausages are drawn by the carriers, and means for reciprocating the brushes including fulcrumed levers connected with the brush-shafts and a crank mechanism connected with the levers.

12. In a sausage-cleaning machine, the combination of a main frame, a tank or vat, vertically-traveling chains or carriers one upon each side of the frame, horizontal parallel brushes and means for rotating the same in opposite directions, a double row of oppositely-rotating vertical brushes above the horizontal brushes, parallel shafts, gearing between the shafts and the axes of the several vertical brushes, and means connecting the shafts with the power.

13. A sausage-cleaning machine including a water tank or vat, vertical frames or sides rising therefrom, sprocket-wheels on the frames and tank, endless-chain carriers one near each vertical side and engaging the sprocket-wheels, horizontal and vertical brushes arranged in opposing pairs and between which the sausages are drawn by the carriers, means for rotating the brushes of each series in opposite directions, and means for opening and closing the horizontal brushes.

In testimony whereof I have hereunto set my hand in presence of two subscribing witnesses.

GEORGE W. CONSTANTINE.

Witnesses:
GEORGE C. CARROTHERS,
BERT C. COCHRAN.